US Patent Office — 2,926,649 — Patented Mar. 1, 1960

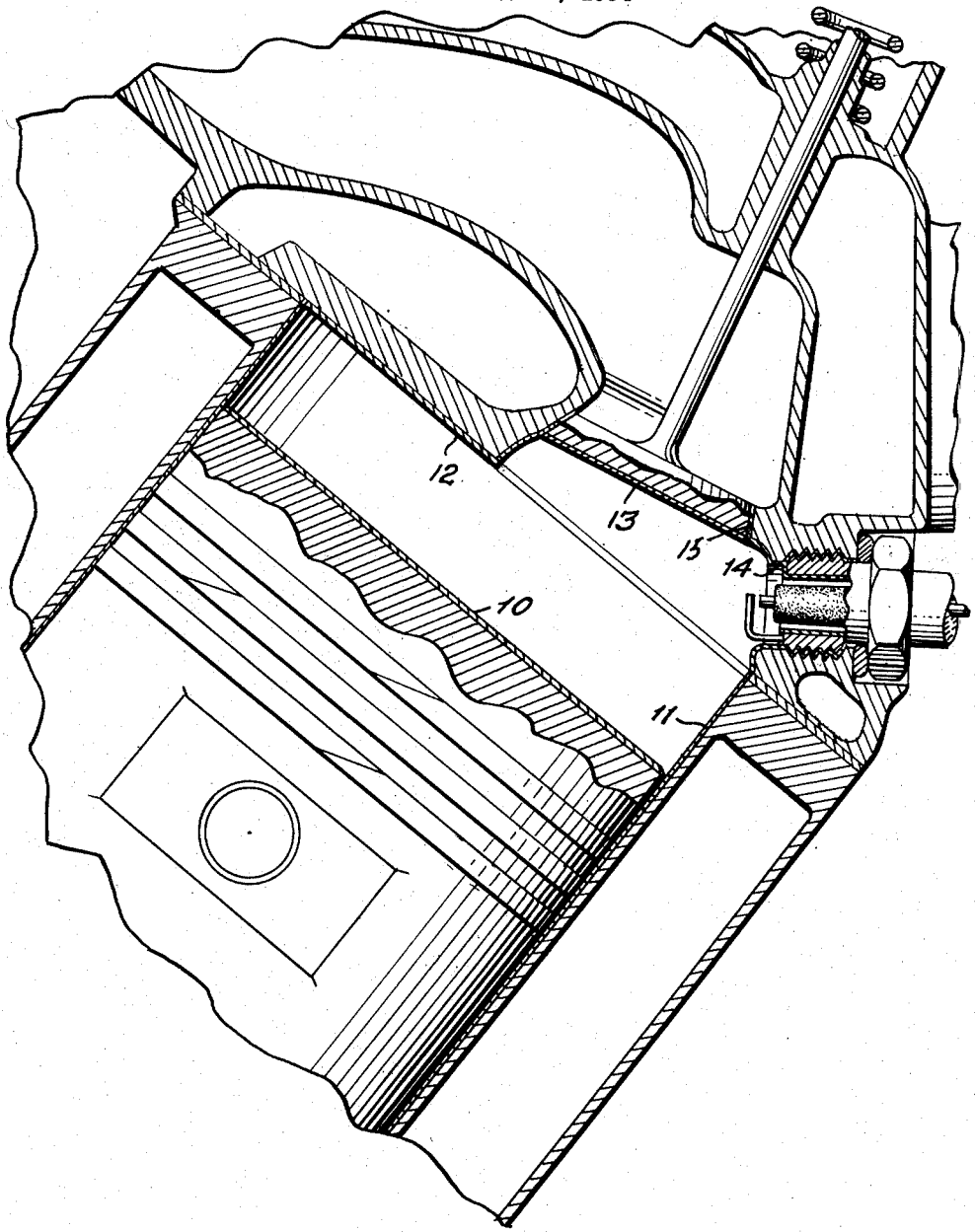

2,926,649

INTERNAL COMBUSTION ENGINES

J Byron Hicks, Euclid, Ohio

Application October 11, 1954, Serial No. 461,407

16 Claims. (Cl. 123—191)

This invention relates to new and useful improvements in internal combustion engines.

It has long been known that the efficiency of the internal combustion engine can be increased by raising the compression ratio. This relationship has made possible the development of more efficient engines. In the automotive field engines having higher compression ratios are extensively produced and used and these engines have good performance characteristics.

While in accordance with thermodynamic theory, the efficiency of the internal combustion engine can be increased to a figure approaching 100 percent, it has been found that a serious limitation is imposed by the occurrence at the higher compression ratios of malfunctioning due to preignition. This limitation has held ratios of higher compression ratio engines to a maximum not substantially above the range of 6.5 to 1 to 7.5 to 1. While higher ratio engines have been built and are known to operate at greater efficiencies, the practical limit is determined by the onset of preignition after a period of operation.

Search for the cause of preignition in high compression ratio engines which in the initial stages of operation perform satisfactorily, has led to the discovery that a major cause of preignition is the formation of carbon. It has been found that an engine which has been operated long enough to develop deposits of carbon in the combustion chamber begins to exhibit preignition trouble, although initially it may have been free from malfunctioning due to this cause.

There has been considerable work done in the effort to overcome preignition, directed toward preventing overheating of the engine surfaces in contact with the combustion mixture, and toward avoiding uneven distribution of heat and development of hot spots. This line of attack has yielded interesting results but has failed to provide a satisfactory solution to the problem.

The role of carbon in causing preignition is believed to be not a simple matter of heat conduction. Where carbon is present a relatively rough or uneven surface is presented whereon the carbon is to a considerable extent distributed in the form of particles clinging or hanging from the combustion chamber walls. According to available evidence, during the compression stroke, these small particles become heated to incandescence. Thus ignition of the combustion mixture by these incandescent points will occur in advance of the spark ignition.

Regardless of the exact manner in which carbon functions, its role as a causative factor is well established. It is an object of my invention to overcome the deleterious effect of the presence of carbon.

Proceeding in accordance with my invention I have found that in inhibiting the occurrence of preignition, the effect of carbon deposits can be substantially overcome, by establishing on the surfaces of the combustion chamber of the internal combustion engine, a carbon deposit reducing coating of suitable characteristics. I have found that when the formation of a carbon deposit is thus retarded or prevented, the engine having a higher compression ratio, will continue to operate for long periods of time without malfunctioning due to preignition.

For this purpose I have found that a carbon deposit reducing coating of chromium is eminently suitable. This metal may be applied to the surfaces of the combustion chamber by processes well known to the art. For example, the method of depositing chromium by electrolysis from a plating bath, which is described in the Patent No. 2,048,578 issued July 21, 1936, to Van Der Horst, is adaptable to my purpose. Moreover, chromium, when properly applied provides a durable and corrosion-resistant surface well suited to conditions that prevail within the combustion chamber.

While the frictional qualities of chromium when used on bearing surfaces are well known, these are not of especial importance in my invention. My invention is to be distinguished from these applications in that I apply the chromium to the surfaces of the combustion chamber that are not involved in frictional engagement, any contiguity or overlapping of these surfaces with the friction surfaces being of minor and incidental importance. Specifically, I may apply the chromium to the top of the piston, to the top portions of the cylinder walls, to the cylinder head, and to the valve and spark plug surfaces. While retardation of the formation of carbon on smaller areas is desirable, for my purpose the major area of the combustion chamber should be protected, and preferably the entire chamber should be coated.

It will be understood that in referring to carbon in the environment of the combustion chamber of an internal combustion engine I refer to the complex deposits that form therein. I am accordingly employing the term, carbon, in the sense that it is commonly used in the cognizant art and as well understood by automotive engineers.

Among materials other than chromium that are suitable for my purpose, cadmium is worthy of note. This element may be deposited by known electrolytic processes. While I prefer to use a metallic material and while such metals as platinum, nickel, silver and gold, may be applied, I regard these as less practical for my purpose. While I have specifically referred to electrolytic methods of depositing the material, other processes that produce a smooth even surface may be employed. It is desirable that the surface present a polished appearance.

While I do not wish to be bound by any theory of operation and while I am of the opinion that the action of the coating may well be considered to be mechanical in resisting the formation of carbon deposits, I would not preclude the possibility that chemical action is involved. Inasmuch as the deposition of carbon results from the decomposition of hydrocarbons which compose the fuel and lubricant substances which enter the combustion chamber, the action of the metal surfaces may involve catalysis. In this view the action of the coating may be described as anticatalytic.

The figure of drawing constitutes a sectional view of the head portion of a conventional modern Otto cycle automotive engine. In the drawing the surfaces of the combustion chamber are shown as bearing a carbon deposit reducing coating on the top of the piston 10, on the cylinder walls 11, on the cylinder head 12, on the valve surface 13, and on the spark plug surfaces 14. The coating on the walls of the combustion chamber 11 is shown as extending down the cylinder walls. On the valve surface the coating also extends beyond limits of the combustion chamber proper as shown at 15.

This drawing taken in conjunction with the description herein, constitutes a full disclosure of a preferred embodiment of my invention. My invention may be applied to any and all internal combustion engines of useful type, wherein preignition may be encountered, whether or not same are designed to operate on the Otto cycle.

From the foregoing description and illustration of an embodiment of my invention, further details within the scope thereof will be apparent to those skilled in the art, or may be further developed, I have set forth the aforesaid examples by way of illustration and not of limitation, and what I claim and desire to protect by Letters Patent is as follows:

1. The method of operating an internal combustion engine wherein on effecting combustion carbon normally accumulates on the surfaces of the top of the piston to an extent causing preignition the improvement comprising inhibiting preignition by effecting combustion in the presence of a carbon deposit reducing chromium coating on the surfaces of the top of the piston, said coating having a polished surface.

2. The method of improving the operating characteristics of an internal combustion engine which comprises depositing on the surfaces of the top of the piston a carbon reducing chromium coating, having a polished surface.

3. In the operation of an internal combustion engine having a combustion chamber normally subject to accumulation of carbon deposits, the improvement comprising reducing the deposit of carbon by effecting combustion in the presence of a carbon deposit reducing chromium coating on the surfaces of the top of the piston, said coating having a polished surface.

4. An internal combustion engine having a piston on the top surface of which is deposited a carbon deposit reducing chromium coating, having a polished surface.

5. The piston of an internal combustion engine the top surfaces of said piston having deposited thereon a carbon deposit reducing chromium coating, having a polished surface.

6. The method of operating an internal combustion engine wherein on effecting combustion carbon normally accumulates on the surfaces of the combustion chamber to an extent causing preignition, the improvement comprising inhibiting preignition by effecting combustion in the presence of a carbon deposit reducing heat conducting surface coating on the top of the piston, said coating consisting of a substantially unalloyed metal which is corrosion-resistant under conditions prevailing in the combustion chamber under normal operating conditions, said coating having a polished surface.

7. The method according to claim 6 wherein said metal is selected from the class of cadmium and chromium.

8. The method of improving the operating characteristics of an internal combustion engine which comprises depositing on the top surface of the piston a carbon deposit reducing heat conducting coating consisting of a substantially unalloyed metal which is corrosion-resistant under conditions prevailing in the combustion chamber under normal operating conditions, said coating having a polished surface.

9. The method according to claim 8 wherein said metal is selected from the class consisting of cadmium and chromium.

10. In the operation of an internal combustion engine having a combustion chamber normally subject to accumulation of carbon deposits, the improvement comprising reducing the deposit of carbon by effecting combustion in the presence of a carbon deposit reducing heat conducting surface coating on the top surface of the piston consisting of a substantially unalloyed metal which is corrosion-resistant under conditions prevailing in the combustion chamber under normal operating conditions, said coating having a polished surface.

11. The improvement according to claim 10 wherein said metal is selected from the class consisting of cadmium and chromium.

12. An internal combustion engine having a piston on the top surface of which is deposited a carbon deposit reducing heat conducting surface coating consisting of a substantially unalloyed metal which is corrosion-resistant under conditions prevailing in the combustion chamber under normal operating conditions, said coating having a polished surface.

13. An internal combustion engine having a piston on the top surface of which is deposited a carbon deposit reducing coating of a metal selected from the class consisting of cadmium and chromium, said coating having a polished surface.

14. An internal combustion engine having a piston on the top surface of which is deposited a carbon deposit reducing coating of chromium, said coating having a polished surface.

15. The piston of an internal combustion engine the top surface of said piston having deposited thereon a carbon deposit reducing metal selected from the class consisting of cadmium and chromium, said coating having a polished surface.

16. The piston of an internal combustion engine the top surface of said piston having deposited thereon a carbon deposit reducing heat conducting surface coating consisting of a substantially unalloyed metal which is corrosion-resistant under conditions prevailing in the combustion chamber under normal operating conditions, said coating having a polished surface.

References Cited in the file of this patent

UNITED STATES PATENTS

| | | |
|---|---|---|
| 1,301,675 | Fessenden | Apr. 22, 1919 |
| 1,391,106 | Guibert | Sept. 20, 1921 |
| 1,559,439 | Kapraun | Oct. 27, 1925 |
| 1,979,476 | Labaw | Nov. 6, 1934 |
| 2,025,020 | Russell et al. | Dec. 17, 1935 |
| 2,057,560 | Dempster | Oct. 13, 1936 |
| 2,075,388 | De Cloud | Mar. 30, 1937 |
| 2,106,914 | L'Orange | Feb. 1, 1938 |
| 2,127,758 | Schmitz | Aug. 23, 1938 |
| 2,181,947 | McCarroll | Dec. 5, 1939 |
| 2,410,405 | Cornelius | Nov. 5, 1946 |
| 2,693,789 | Lechtenberg | Nov. 9, 1954 |

FOREIGN PATENTS

| | | |
|---|---|---|
| 205,476 | Great Britain | Sept. 20, 1923 |
| 629,235 | Great Britain | Sept. 15, 1949 |